US005519589A

United States Patent [19]

Nino

[11] Patent Number: 5,519,589

[45] Date of Patent: May 21, 1996

[54] VEHICULAR LOW BEAM HEADLIGHT REFLECTOR CONSISTING OF UPPER AND LOWER REFLECTING SECTORS

[75] Inventor: Naohi Nino, Shizuoka, Japan

[73] Assignee: Koito Manufacturing Co., Ltd., Tokyo, Japan

[21] Appl. No.: 126,308

[22] Filed: Sep. 24, 1993

[30] Foreign Application Priority Data

Dec. 25, 1992 [JP] Japan .................................... 4-358024

[51] Int. Cl.[6] ...................................................... B60Q 1/02

[52] U.S. Cl. ............................ 362/61; 362/297; 362/347

[58] Field of Search ............................ 362/61, 346, 347, 362/297

[56] References Cited

U.S. PATENT DOCUMENTS

| | | | |
|---|---|---|---|
| 4,772,988 | 9/1988 | Brun | 362/61 |
| 4,841,423 | 6/1989 | Luciani | 362/304 |
| 5,003,447 | 3/1991 | James et al. | 362/297 |
| 5,192,124 | 3/1993 | Kawashima et al. | 362/297 |

*Primary Examiner*—Ira S. Lazarus
*Assistant Examiner*—Sara Sachie Raab
*Attorney, Agent, or Firm*—Sughrue, Mion, Zinn, Macpeak & Seas

[57] ABSTRACT

A reflecting surface is divided into first and second reflecting sectors by a plane inclined from the horizontal plane including the optical axis to occupy the upper half and the lower half of the reflecting surface, respectively. A fundamental surface of the first and second reflecting sectors has a reference parabola in the inclined plane, and is a collection of intersecting lines each obtained by cutting an imaginary paraboloid of revolution having an axis extending in a direction taken by a ray after being emitted from a reference point and then reflected at a reflecting point on a parabola that is an orthogonal projection of the reference parabola onto the horizontal plane, passing through the reflecting point, and having a focus at the reference point by a vertical plane including the ray vector. The focus of the reference parabola is set at the center of a filament. The reference point is set in the vicinity of the rear end of the filament for the first reflecting sector, and in the vicinity of the front end of the filament for the second reflecting sector.

6 Claims, 6 Drawing Sheets

VEHICULAR LOW BEAM HEADLIGHT REFLECTOR CONSISTING OF UPPER AND LOWER REFLECTING SECTORS

BACKGROUND OF THE INVENTION

The present invention relates to a reflector for a vehicular low beam headlight.

The recent trends of the automobile design have been prompting efforts to develop new types of headlights. That is, with the streamlined body shape to satisfy various requirements from, for instance, the body design and aerodynamic characteristics that are related to the automobile styling, headlights need to be constructed so as to accommodate what is called the slant nose, i.e., the reduced front portion of a vehicle body.

However, in forming a light distribution pattern having a cutline specific to the low beam with the configuration of conventional headlights, lens steps of an outer lens have an important role in the light distribution control. Therefore, the outer lens cannot be inclined from the vertical axis more than a certain limit. That is, the conventional configuration cannot properly accommodate the slant nose.

In view of the above, various types of headlights have been proposed to shift the light distribution control function, which conventionally belonged to the lens steps of the outer lens, to the reflector. That is, a reflecting surface is divided into a number of light distribution control sectors and their shapes are designed so that a combined pattern of projection patterns of the respective sectors approximates the standard light distribution pattern, to thereby reduce the load in the light distribution control imposed on the outer lens.

However, to produce the light distribution pattern having the cutline specific to the low beam by the conventional reflecting surface, the number of light distribution control sectors of the reflecting surface tends to increase. If the adjacent reflecting sectors are not connected smoothly, the light reflected by a step at the boundary goes upward to cause glare or becomes undesired light in terms of the light distribution control.

SUMMARY OF THE INVENTION

An object of the present invention is to provide a vehicular headlight reflector having a reflecting surface of a simplified configuration.

A vehicular headlight for forming a low beam comprises a reflecting surface having an optical axis and represented by a fundamental surface which has a reference point on the optical axis and a reference parabola included in a first plane inclined from a horizontal plane including the optical axis by a first predetermined angle and having a vertex and a focus on the optical axis, and which is a collection of intersecting lines each obtained by cutting an imaginary paraboloid of revolution having an axis extending in a ray vector direction taken by a reflected ray after being emitted from the reference point and then reflected at a reflecting point on a parabola that is an orthogonal projection of the reference parabola onto the horizontal plane, passing through the reflecting point, and having a focus at the reference point by a vertical plane including the ray vector. According to the invention, the vehicular headlight comprises a light source having a central axis extending along the optical axis, and first and second reflecting sectors divided by a second plane inclined from the horizontal plane by a second predetermined angle to occupy an upper half and a lower half of the reflecting surface, respectively, the first reflecting sector having the focus of the reference parabola approximately at a center of the light source and the reference point in the vicinity of a rear end of the light source, and the second reflecting sector having the focus of the reference parabola approximately at the center of the light source and the reference point in the vicinity of a front end of the light source.

DESCRIPTION OF THE PREFERRED EMBODIMENT

Details of a reflector for a vehicular headlight according to an embodiment of the present invention is described hereinafter with reference to the accompanying drawings.

Figure 1:
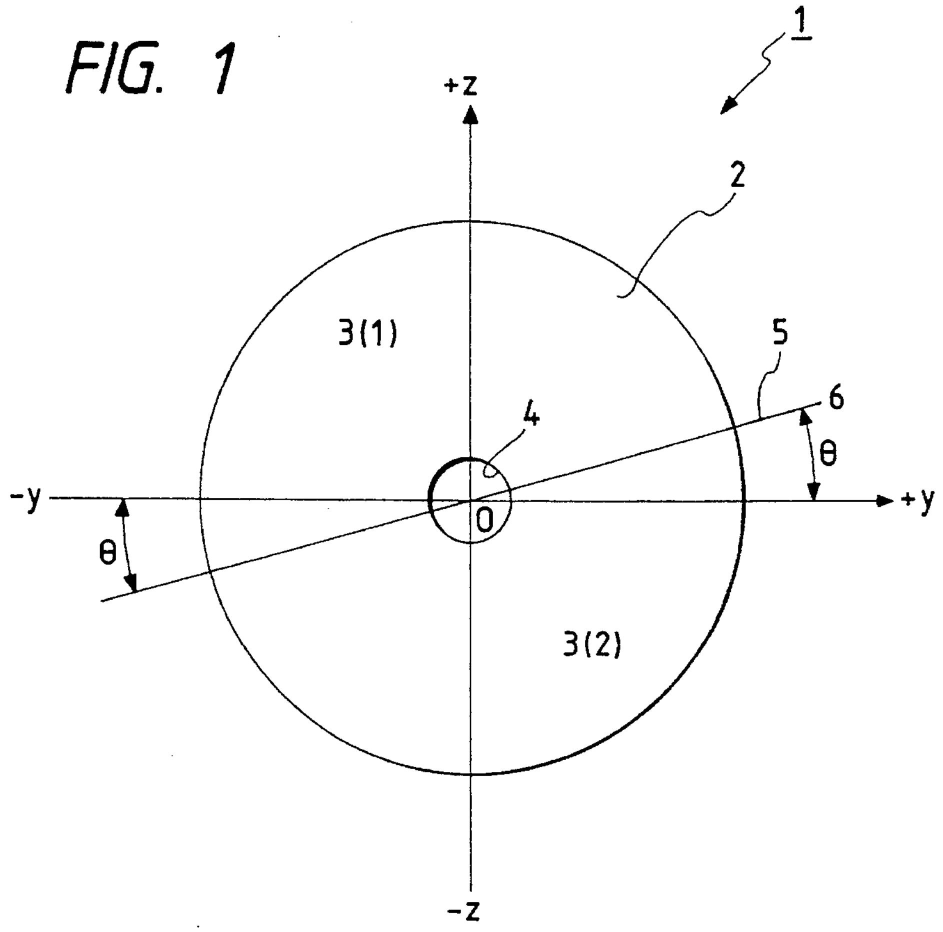
FIG. 1 is a front view showing a configuration of a reflecting surface according to the present invention.

FIG. 1 is a front view of a reflector 1. Its reflecting surface 2 is divided into two semicircular reflecting sectors 3(1) and 3(2) in terms of light distribution control.

The coordinate system for the reflecting surface 2 is defined as follows. The optical axis of the reflecting surface 2 is selected as the x-axis (extending perpendicularly to the paper surface of FIG. 1 and having the positive direction on the front side). The axis perpendicular to the x-axis and extending in the horizontal direction is selected as the y-axis (the right-hand side of FIG. 1 is the positive side). The axis perpendicular to the x-axis and extending in the vertical direction is selected as the z-axis (the upper half of FIG. 1 is the positive half). The origin O of the orthogonal coordinate system is located at the center of a bulb fixing hole 4 when viewed from the front side.

A line 5 passing through the origin O corresponds to a plane 6 including the x-axis and inclined from the xy-plane by an angle $\theta$ ($\theta>0$ where the positive direction is the counterclockwise direction about the x-axis when viewed from the front side), and conceptually indicates a boundary between the reflecting sectors 3(1) and 3(2). The reflecting sectors (1) and 3(2) are located on the upper and lower sides of the plane 6, respectively. That is, the reflecting sector 3(1) exists in the first to third quadrants of the yz-plane, and the reflecting sector 3(2) exists in the third, fourth and first quadrants of the yz-plane.

The fundamental surface of each of the sectors 3(1) and 3(2) is of the type disclosed in U.S. patent application Ser. No. 07/808,670 filed by the present applicant, and is summarized below.

Figure 3:
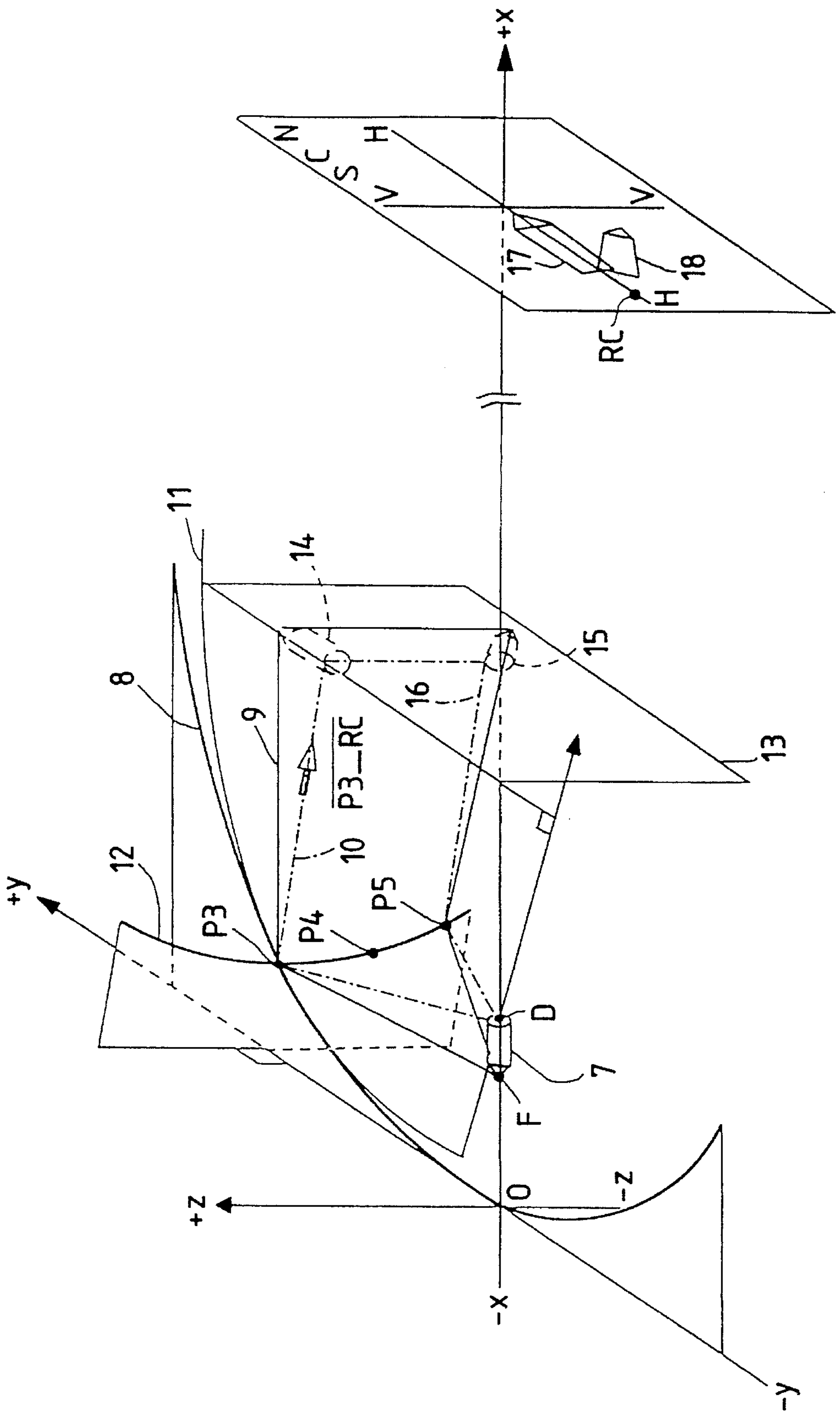
FIG. 3 is a light path diagram with a fundamental surface of the invention.

As shown in FIG. 3, a filament 7 is disposed between point F (hereinafter called a "first focus") and point D (hereinafter called a "second focus"), with its central axis along the x-axis. Point D is deviated from point F by a distance d in the positive direction of the x-axis.

To clarify the orientation of the filament 7, an assumption "the filament 7 has a pencil-like form with its one tip on the side of point F having a cone-like pointed shape and the other tip on the side of point D being flat" is employed just for convenience of description.

First, a parabola 8 having a focus at point F is assumed on the xy-plane.

After being emitted from point F (near the rear end of the filament 7) and then reflected at point P3 on the parabola 8, a ray 9 travels in parallel with the optical axis (i.e., x-axis). On the other hand, after being emitted from point D (near the front end of the filament 7) and then reflected at point P3, a ray 10 travels toward point RC on a screen SCN far from the reflector 1 and crosses the optical axis. That is, the ray 10 has a vector P3_RC as its direction vector.

Now, another parabola 11 is assumed which has a focus at point D and an axis extending parallel to vector P3_RC. As shown in FIG. 3, the parabola 11 also passes through point P3.

A paraboloid of revolution is obtained by rotating the parabola 11 about its axis, and a parabola 12 is obtained by cutting this paraboloid of revolution by a plane including the vector P3_RC and perpendicular to the xy-plane.

A curved surface is generated as a collection of the parabolas 12 obtained as point P3 is moved along the parabola 8.

Filament images are projected onto a plane 13 in the following manner in the midst of traveling of rays toward the screen SCN. Am image 14 due to point P3 is in parallel with the horizontal line. An image 15 due to point P5 that is on the parabola 12 and lower than point P3 forms a certain angle with the horizontal line. The path taken by a ray 16 after being reflected at point P5 is in parallel with the path taken by the ray 10 after being reflected at point P3 (both of the rays 10 and 16 are emitted from point D).

Since the intersecting line is defined so that the rays relating to the formation of the flat ends of the filament images 14 and 15 become in parallel with each other, filament images 17 and 18 are formed on the screen SCN with point RC as their rotation center (the above parallel rays substantially coincide with each other at point RC).

Figure 4:
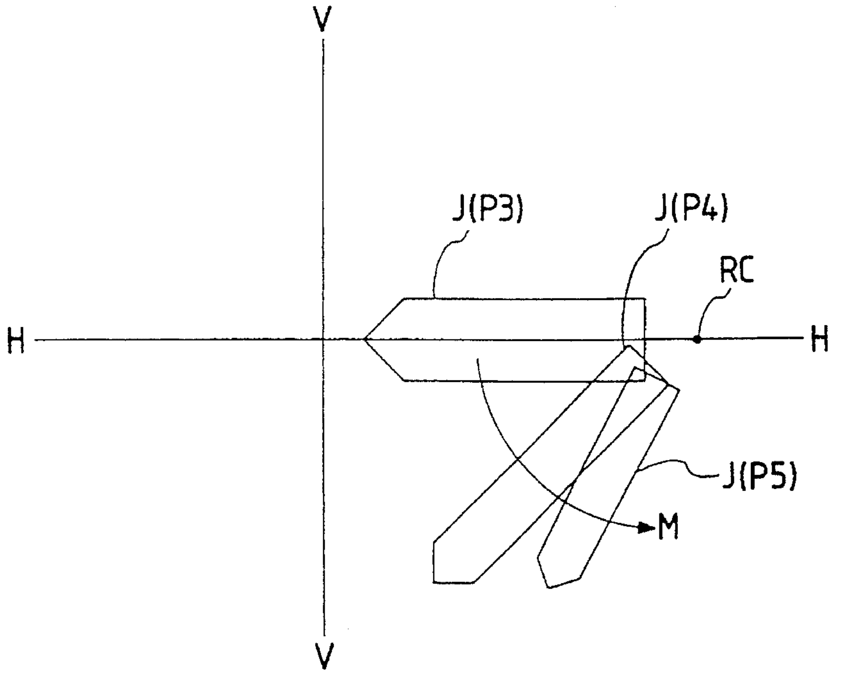
FIG. 4 shows an arrangement of filament images produced by the fundamental surface of the invention.

FIG. 4 schematically shows an arrangement of the filament images due to points P3 and P5, and point P4 that is on the parabola 12 and located between points P3 and P5.

In FIG. 4, J(X) indicates a filament image corresponding to each representative point X. Filament images J(P3), J(P4) and J(P5) due to points P3, P4 and P5 are arranged with point RC on the horizontal line H—H as their rotation center. That is, as indicated by arrow M, the filament image rotates counterclockwise about point RC as the reflection point goes down (P3→P4→P5). The filament images are located under the horizontal line H—H while their flat ends are always directed to point RC.

Figure 5:
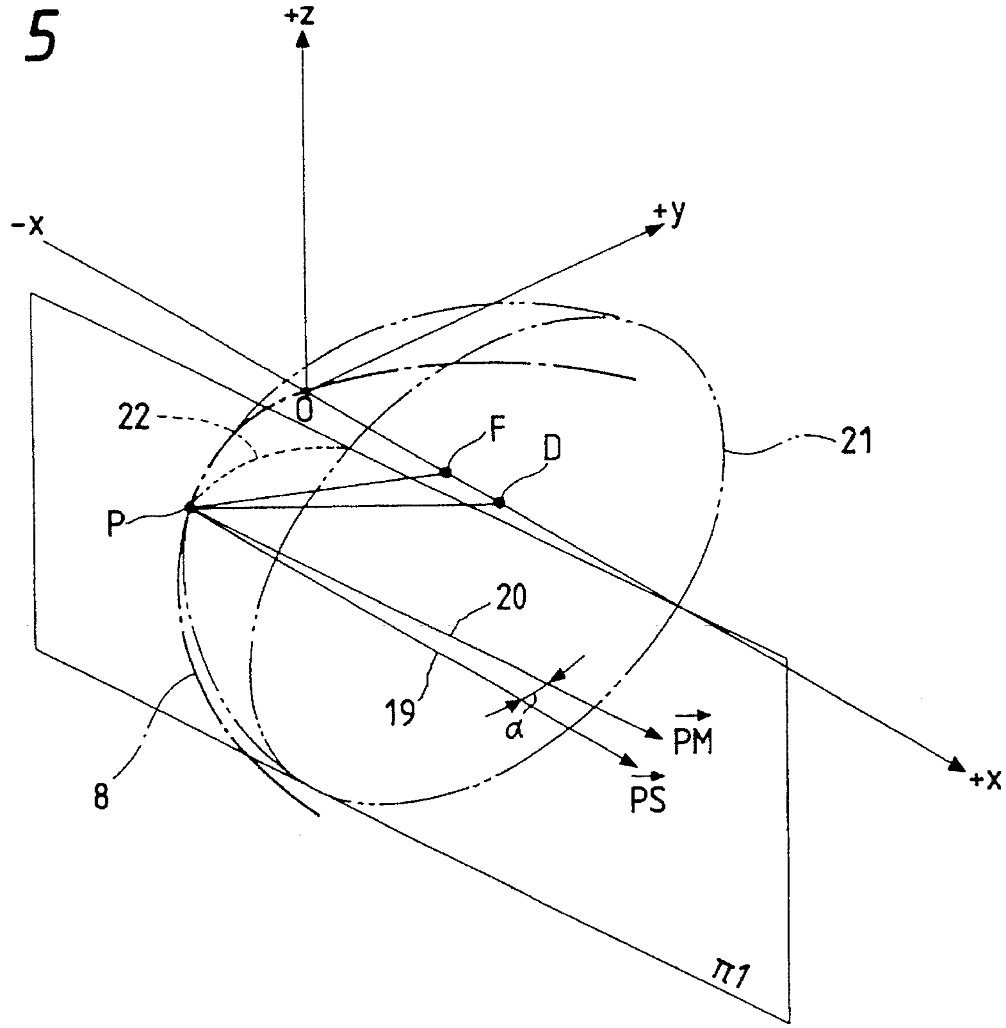
FIG. 5 is a perspective view schematically illustrating formation of the fundamental surface of the invention.

FIG. 5 shows how the reflecting surface 2 is generated. In FIG. 5, point P is an arbitrary point located on the parabola 8 that is included in the xy-plane. (By introducing a parameter q, coordinates of point P are expressed as $(q^2/f, -2q, 0)$.) After being emitted from point F and then reflected at point P, a ray 19 travels in parallel with the x-axis as indicated by a vector PS.

On the other hand, after being emitted from point D and then reflected at point P with a reflection angle smaller than that of the ray 19 according to the law of reflection, a ray 20 travels straight (indicated by a vector PM) forming a certain angle $\alpha$ with the ray 19.

Now, an imaginary paraboloid of revolution 21 (indicated by a two-dot chain line) is assumed which has a focus at point D and an axis passing through point P and extending along the ray vector PM. A cross-sectional curve is obtained by cutting the paraboloid of revolution 21 by a plane $\pi 1$ including the ray vector PM and parallel with the z-axis. (An intersecting line 22 of the paraboloid of revolution 21 and the plane $\pi 1$.)

It is apparent that the above cross-sectional curve (indicated by a dashed line) is a parabola. The fact that rays emitted from point D and then reflected at arbitrary points on the intersecting line 22 travel in parallel with each other conform to the situation described in connection with FIG. 3.

In this manner, the fundamental surface is obtained as a collection of intersecting lines of the imaginary paraboloids of revolution corresponding to points P on the parabola 8 and the planes including the respective axes of the imaginary paraboloids of revolution and parallel with the z-axis.

This curved surface is expressed by Eq. 1 with the use of parameters shown in Table 1.

TABLE 1

| Parameter | Definition |
|---|---|
| f | Focal length of parabola 8 ($\overline{OF}$) |
| d | Interval between points F and D ($\overline{FD}$) |
| q | Specifying a point on parabola 8 |
| h | Height in z-direction from plane z = 0 |
| Q | $= (f^2 + q^2)/f$ |

$$x = \frac{(Q-f)\left[1 + \frac{2d(Q-f)}{Q^2 + (2f-Q)d}\right] + \frac{h^2}{4f(1 + d/Q)}}{1 + \frac{2d(Q-f)}{Q^2 + (2f-Q)d}} \tag{1}$$

$$y = 2q\left[\frac{d(x-Q+f)}{Q^2 + (2f-Q)d} - 1\right]$$

$$z = h$$

$$\text{where } Q = \frac{f^2 + q^2}{f}$$

The process of deriving Eq. 1 is not described here because doing so may unduly complicate the description of the invention. But it is noted that Eq. 1 can be obtained based on only the above description and knowledge of elementary algebraic geometry. Further, it is understood that Eq. 1 also expresses paraboloids of revolution as a special case of d=0.

Equation 1 is generalized into Eq. 2 in which a parabola on a plane inclined from the xy-plane by an angle $\theta$ is employed instead of the parabola 8.

$$x = x(q,h,f,d,\theta) = \frac{(Q-f)\left[\frac{d}{Q} + \cos^2\theta\left(1 - \frac{d}{Q} + \frac{2d(Q-f)}{Q^2+(2f-Q)d}\right)\right] + \frac{h^2}{4f(1+d/Q)}}{1 + \frac{2d(Q-f)\cos^2\theta}{Q^2+(2f-Q)d}}$$

$$y = y(q,f,d,\theta) = 2q\cos\theta\left[\frac{d(x-Q+f)}{Q^2+(2f-Q)d} - 1\right] \quad (2)$$

$$z = z(h) = h$$

$$\text{where } Q = \frac{f^2+q^2}{f}$$

By substituting $\theta=0$ into Eq. 2, it is easily verified that Eq. 2 includes Eq. 1.

Figure 2:
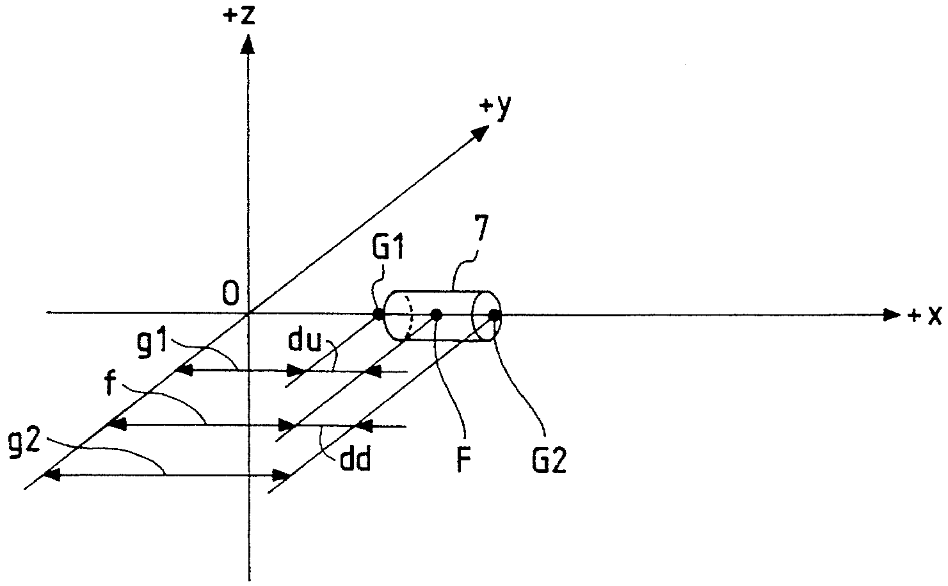
FIG. 2 illustrates a positional relationship between a focus and a filament that is disposed along the optical axis.

FIG. 2 shows how the filament 7 and foci are located with respect to the reflecting surface 2. The central axis of the filament 7 extends along the x-axis.

Point F is the first focus common to the reflecting sectors 3(1) and 3(2) and is located on the x-axis at the center of the filament 7 that is away from the origin O by a distance f. Point G1 is the second focus of the reflecting sector 3(1), and is located in the vicinity of the rear end of the filament 7, i.e., located on the positive side of the x-axis at a position away from the origin O by a distance g1. If parameter du is defined as g1–f, a relationship du<0 holds. Point G2 is the second focus of the reflecting sector 3(2), and is located in the vicinity of the front end of the filament 7, i.e., located on the positive side of the x-axis at a position away from the origin O by a distance g2. If parameter dd is defined as g2–f, a relationship dd>0 holds.

Therefore, the reflecting sector 3(1) has a reflecting surface according to Eq. 2 in which the first and second foci are located at points F and G1, respectively. More specifically, equations for the reflecting surface of the sector 3(1) is obtained by substituting d=du and $\theta=\theta_0$ ($\theta_0$ corresponds to the cutline angle) into Eq. 2. On the other hand, the reflecting sector 3(2) has a reflecting surface according to Eq. 2 in which the first and second foci are located at points F and G2, respectively. More specifically, equations for the reflecting surface of the sector 3(2) is obtained by substituting d=dd and $\theta=\theta_0$ into Eq. 2.

Table 2 shows the definitions of the above parameters.

TABLE 2

| Sector | Distance from origin to 1st focus | Distance from 1st focus to 2nd focus | Angular parameter θ |
|---|---|---|---|
| 3(1) | f | \|du\| | $\theta_0$ |
| 3(2) | f | \|dd\| | $\theta_0$ |

Figure 6:
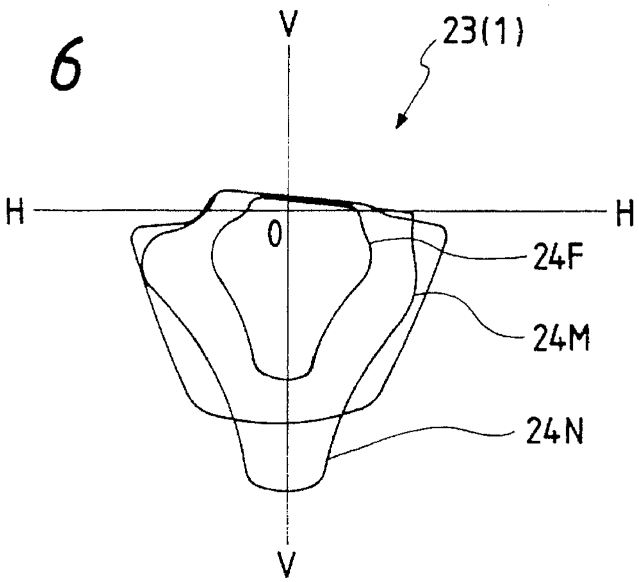
FIG. 6 schematically shows projection patterns by a reflecting sector 3(1)
Figure 7:
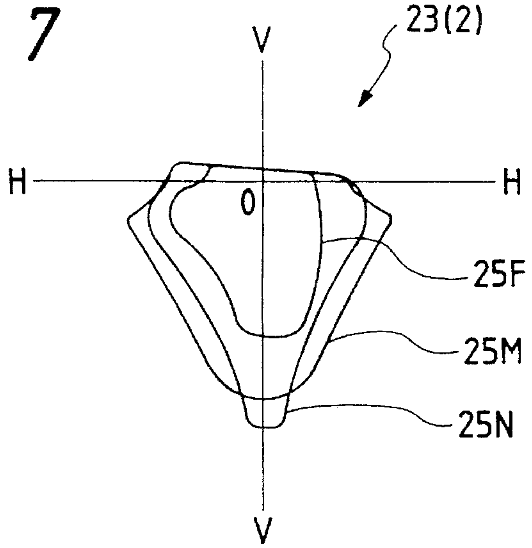
FIG. 7 schematically shows projection patterns by a reflecting sector 3(2)
Figure 8:
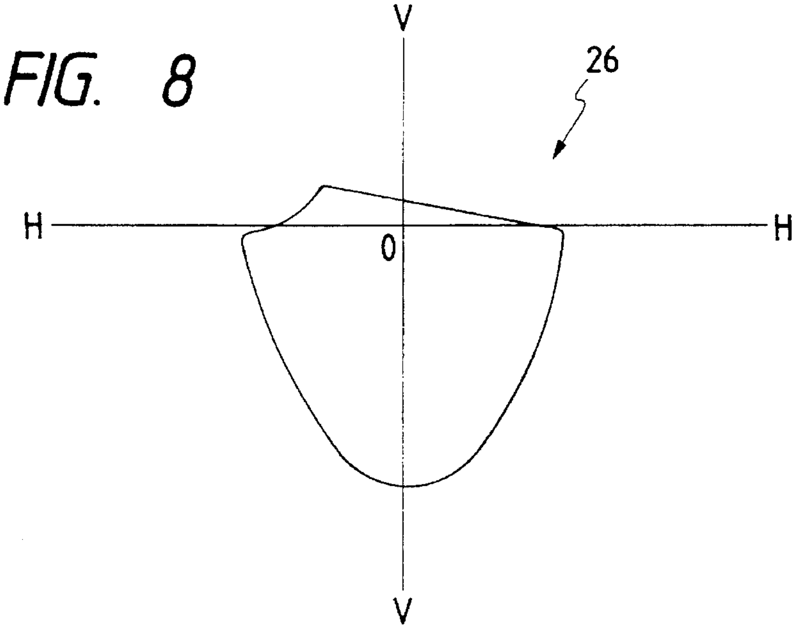
FIG. 8 schematically shows a combined projection pattern by the reflecting sectors 3(1) and 3(2)

FIGS. 6–8 schematically show projection patterns 23(1) and 23(2) produced by the reflecting sectors 3(1) and 3(2) and a combined projection pattern 26 thereof. In those figures, H—H and V—V denote the horizontal line and the vertical line, respectively, and point o is an intersecting point thereof.

FIG. 6 shows the projection pattern 23(1) by the reflecting sector 3(1). In FIG. 6, symbols 24N, 24M and 24F denote patterns (schematically drawn) produced as combinations of filament images reflected at points located at circles having different distances from the x-axis when viewed from the front side. The pattern 24N corresponds to the circle closest to the x-axis, and the pattern 24F corresponds to the circle most distant from the x-axis. The pattern 24M corresponds to the circle located at the middle of the circles of the patterns 24N and 24F.

As shown in FIG. 6, most of each of the patterns is located below the horizontal line H—H; only an upper edge portion is located above the horizontal line H—H. The vertical width decreases in the order of 24N, 24M and 24F.

FIG. 7 shows the projection pattern 23(2) by the reflecting sector 3(2). In FIG. 7, symbols 25N, 25M and 25F denote patterns (schematically drawn) produced as combinations of filament images reflected at points located at circles having different distances from the x-axis when viewed from the front side. The pattern 25N corresponds to the circle closest to the x-axis, and the pattern 25F corresponds to the circle most distant from the x-axis. The pattern 25M corresponds to the circle located at the middle of the circles of the patterns 25N and 25F.

As in the case of the patterns shown in FIG. 6, most of each of the patterns is located below the horizontal line H—H; only an upper edge portion is located above the horizontal line H—H. The vertical width decreases in the order of 25N, 25M and 25F. On the other hand, on the whole the horizontal widths are somewhat smaller than those of the patterns of FIG. 6.

FIG. 8 schematically shows the pattern 26 that is a combination of the projection patterns of FIGS. 6 and 7. The portion located below the horizontal line H—H is bowl-shaped, and the portion located above the horizontal line H—H has the upper edge that is inclined downward toward the right.

The projection pattern 26 is the basis of the light distribution pattern to be obtained finally, and it is necessary to horizontally diffuse the pattern 26 and form the cutline by certain measures.

In conventional headlights, lens steps having diffusive action are formed on an outer lens disposed in front of the reflector 1. However, it becomes difficult to form lens steps having strong horizontal diffusive action as the inclination of the outer lens is increased. In such a case, it is necessary to shift the diffusive action to the reflector.

The present invention employs a method of diffusing light only by the reflector 1 by smoothly undulating the reflecting surface 2. More specifically, a set of equations representing a wave-like pattern are combined with the abovedescribed equations representing the reflecting surface 2.

The following function is introduced for that purpose:

$$Aten(s,W) = \exp\left[-\left(\frac{2s}{W}\right)^2\right] \quad (3)$$

Figure 9:
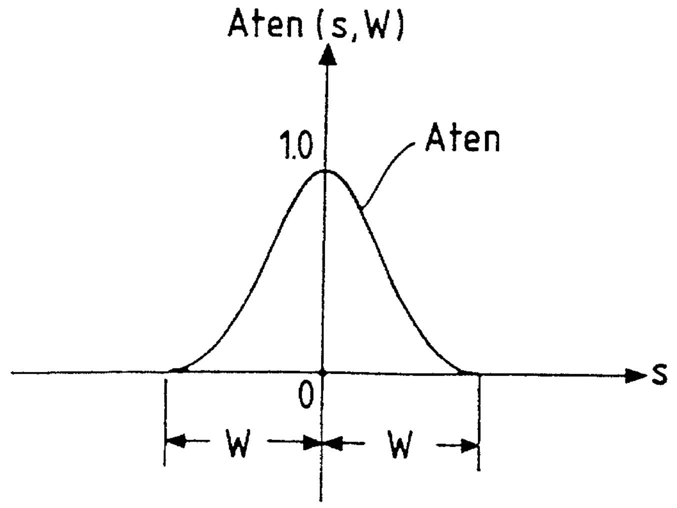
FIG. 9 is a graph showing a normal distribution type function Aten(s, W)

In the normal distribution type (or Gaussian) function Aten(s, W) using parameters s and W, the parameter W specifies the degree of attenuation. FIG. 9 shows the shape of the function Aten(s, W).

Further, a periodic function WAVE(s, λ) using a parameter λ is introduced:

$$WAVE(s,\lambda) = \frac{1 - \cos\left(360° \cdot \frac{s}{\lambda}\right)}{2} \quad (4)$$

Figure 10:
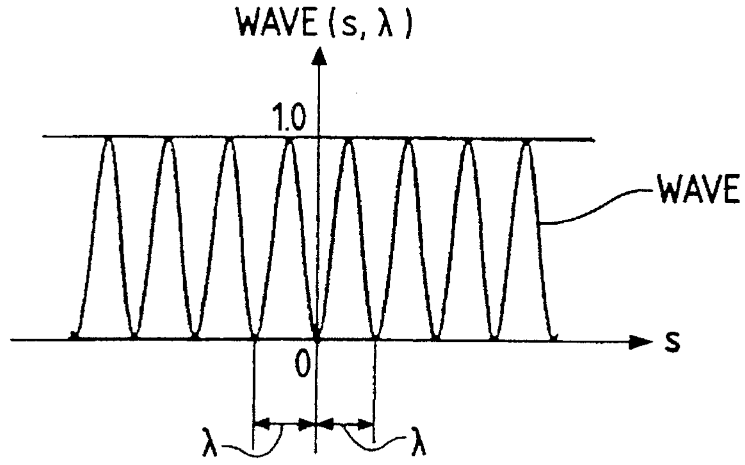
FIG. 10 is a graph showing a periodic function WAVE(s, $\lambda$)

The parameter λ specifies the wavelength, i.e., pitch of the cosine wave. FIG. 10 shows the shape of the function WAVE(s, W). While in this embodiment the cosine function is employed as the periodic function, other various periodic functions may be used when necessary.

Figure 11:
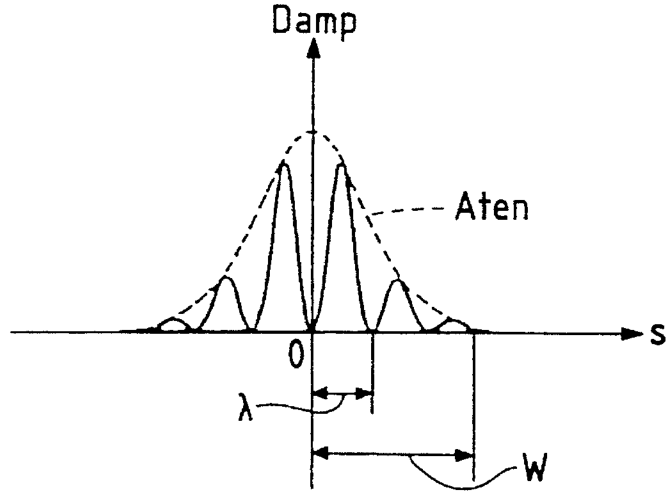
FIG. 11 is a graph showing a damped periodic function Damp(s, $\lambda$)

A damped periodic function Damp shown in FIG. 11 is obtained as a product of the above two kinds of functions. The reflecting surface 2 can be undulated by applying to it a function produced from the basic function Damp.

Figure 12:
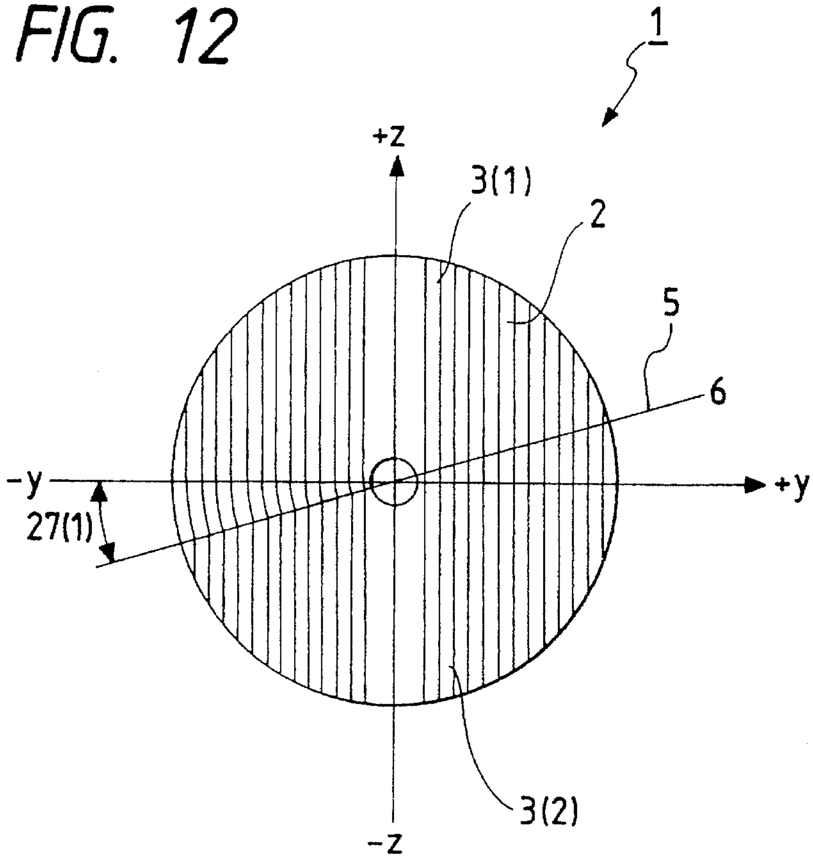
FIG. 12 is a front view schematically showing an example of undulations applied to the reflecting surface.

FIG. 12 shows an example of undulations applied to the reflecting surface 2. In FIG. 12, among protrusions and dents formed on the reflecting surface 2, the protrusions are schematically indicated by lines.

As shown in FIG. 12, regions for the application of undulations do not coincide with the sectors of the reflecting surface 2. Circular waves having the center at the origin O are applied in a fan-shaped region 27(1) of the reflecting sector 3(1) close to the xy-plane. Plane waves developing in the horizontal direction are applied in the remaining region.

Figure 13:
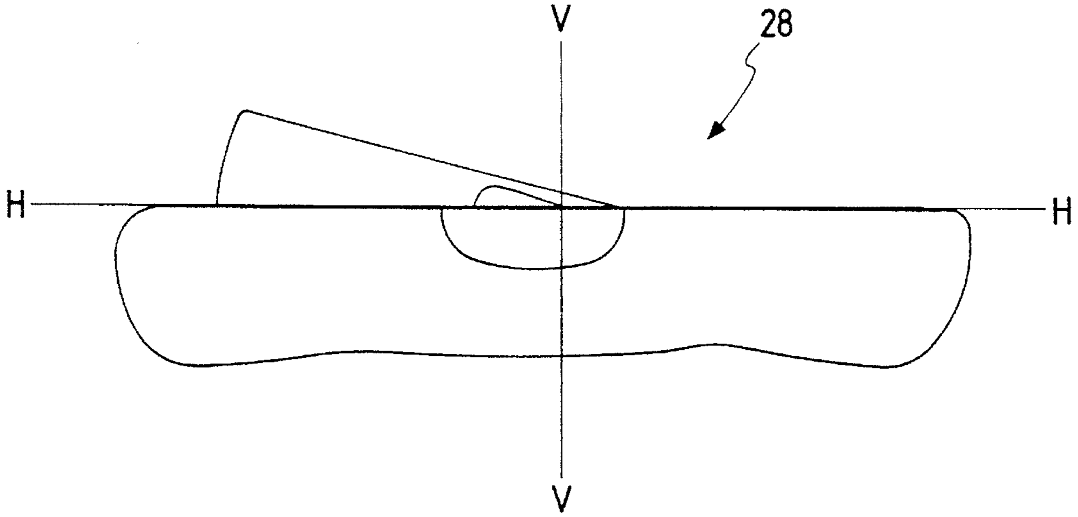
FIG. 13 schematically shows a projection pattern by the undulated reflecting surface.

FIG. 13 schematically shows a projection pattern 28 produced by the reflecting pattern 2 as modified by application of the undulations described above. FIG. 13 shows that the pattern approximating the standard light distribution pattern can be obtained only by the action of the reflecting surface.

As described above, according to the invention, the number of light distribution control sectors can be reduced. Since the reflecting sectors can be connected smoothly at the boundary, the light reflected at the boundary neither causes conspicuous glare nor becomes undesired light in forming the light distribution pattern.

Further, by introducing the undulations in the manner as described above, the dependence on the outer lens in the light distribution control can be reduced to enable construction of reflectors suitable for the slant-type vehicle body shape.

What is claimed is:

1. A vehicular headlight for forming a low beam comprising a reflecting surface having an optical axis and being represented by a fundamental surface which has a reference point on said optical axis and a reference parabola, said reference parabola being included in a first plane that is inclined by a first predetermined angle from a horizontal plane that contains said optical axis and said reference parabola having a vertex and a focus on said optical axis, said fundamental surface being a collection of intersecting lines each obtained by cutting an imaginary paraboloid of revolution by a vertical plane, said paraboloid of revolution having an axis extending in parallel with a ray vector direction taken by a reflected ray after being emitted from said reference point and then reflected at a reflecting point on a parabola that is an orthogonal projection of said reference parabola onto said horizontal plane, passing through said reflecting point, and having a focus at said reference point, and said vertical plane including said ray vector, said vehicular headlight further comprising:

a light source having a central axis extending along said optical axis and comprising a front end, a center and a rear end along said central axis; and first and second reflecting sectors divided by a second plane inclined from said horizontal plane by a second predetermined angle to occupy an upper half and a lower half of said reflecting surface, respectively, said first reflecting sector having the focus of the reference parabola approximately at said center of said light source and said reference point in the vicinity of said rear end of said light source, and said second reflecting sector having the focus of said reference parabola approximately at said center of said light source and said reference point in the vicinity of said front end of said light source.

2. The vehicular headlight of claim 1, wherein the first and second predetermined angles are identical and equal to a cutline angle.

3. The vehicular headlight of claim 1, wherein a light distribution pattern projected onto a distant front screen by the first reflecting sector is larger than a light distribution pattern projected by the second reflecting sector.

4. The vehicular headlight of claim 1, wherein as a reflecting point on the reflecting surface moves away from the optical axis, a light source image projected onto a distant front screen moves toward a central portion of the screen.

5. The vehicular headlight of claim 1, wherein a function that is a product of a normal distribution type function and a periodic function is applied to equations representing the reflecting surface to make the reflecting surface undulatory such that when viewed from a front side circular waves are applied to the reflecting surface in a first region close to the horizontal plane and plane waves developing in a horizontal direction are applied to the reflecting surface in a remaining region of the reflecting surface other than the first region.

6. The vehicular headlight of claim 5, wherein the first region is a part of the first reflecting sector located below the horizontal plane.

* * * * *